M. E. GILLESPIE.
LOCK NUT AND BOLT.
APPLICATION FILED JULY 29, 1919.

1,377,196.

Patented May 10, 1921.

Inventor
M. E. Gillespie,
By C. A. Snow & Co.
Attorneys

Witness

UNITED STATES PATENT OFFICE.

MATHIAS E. GILLESPIE, OF ROSEBURG, OREGON.

LOCK-NUT AND BOLT.

1,377,196.  Specification of Letters Patent.  Patented May 10, 1921.

Application filed July 29, 1919. Serial No. 313,977.

*To all whom it may concern:*

Be it known that I, MATHIAS E. GILLESPIE, a citizen of the United States, residing at Roseburg, in the county of Douglas and State of Oregon, have invented a new and useful Lock-Nut and Bolt, of which the following is a specification.

The device forming the subject matter of this application is a nut lock, and the invention aims to provide a novel pawl mechanism carried by the nut and adapted to engage the bolt, the construction being such that the pawl mechanism is accessible to disengage the same from the bolt.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1:
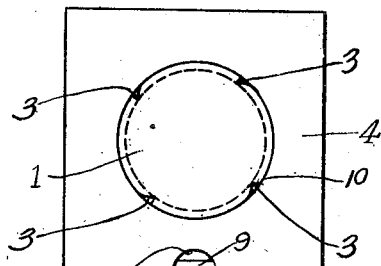
Figure 2:
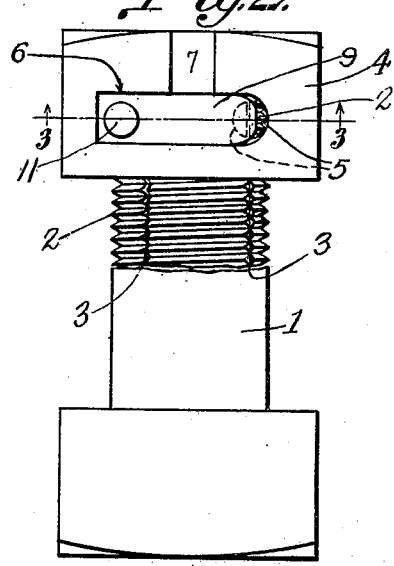

Figure 1 is a top plan; Fig. 2 is a side elevation; and Fig. 3 is a cross section on the line 3—3 of Fig. 2.

In the accompanying drawings, the numeral 1 denotes a bolt having threads 2 and provided with any desired number of longitudinal seats 3, intersecting the threads 2. A nut 4 is mounted on the bolt 1, the nut having a passage 5 in its end, and being provided with a superficial recess 6 communicating at one end with the passage 5. The nut 4 is supplied with a superficial notch 7 communicating with the recess 6 and deeper than the recess, the notch opening through the outer end of the nut, and being disposed at an angle to the recess 6. A spring tongue 9 is mounted in the recess 6 and is provided at one end with a rectangularly disposed pawl 10 located in the passage 5 and adapted to coöperate with any of the seats 3 in the bolt 1. A securing device 11 unites the other end of the spring tongue 9 with the nut 4.

Figure 3:
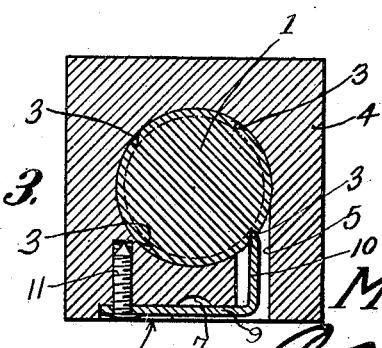

Noting Fig. 3 of the drawings, it will be obvious that the nut 4 may be advanced along the threads of the bolt 1, the pawl 10 clicking into and out of the seats 3. If, however, it is attempted to impart reverse rotation to the nut 4, the pawl 10, coöperating with one of the seats 3, will prevent a reverse rotation of the nut. Since the notch 7 is deeper than the recess 6, a prize tool of any desired sort may be inserted behind the tongue, in the notch 7, for the purpose of springing the tongue 9 outwardly, thereby to disengage the pawl 10 from the seat 3. The nut 4 may then be backed readily off the bolt 1.

Having thus described the invention, what is claimed is:

In a device of the class described a bolt having threads and provided with a longitudinal seat intersecting the threads; a square nut on the bolt, the nut having a superficial recess disposed in one face of the nut, the recess being spaced from all of the edges which define said face, the nut having a superficial notch located in said face midway between the longitudinal edges of said face, the notch being deeper than the recess, one extremity of the notch opening through the outer end of the nut, and the other extremity of the notch terminating at the recess, thereby leaving said face continuous and unbroken between one longitudinal edge of the recess and the adjacent longitudinal edge of the nut, the nut being provided with a passage disposed at one end of the recess and opening through said face; and a spring tongue in the recess and provided at one end with an angularly disposed pawl located in the passage and coöperating with the seat; and a removable securing device passing through the other end of the pawl and connecting the same with the nut, the securing device being located within the contour of said face.

In testimony that I claim the foregoing as my own, I have hereto affixed my signature in the presence of two witnesses.

MATHIAS E. GILLESPIE.

Witnesses:
CHAS. F. HOPKINS,
EDITH E. HOPKINS.